(12) United States Patent
Schoenheider

(10) Patent No.: US 6,864,346 B2
(45) Date of Patent: Mar. 8, 2005

(54) MOLDABLE COMPOSITIONS

(76) Inventor: Cecile J. Schoenheider, 2920 Oxford Ct., Aurora, IL (US) 60504

(*) Notice: Subject to any disclaimer, the term of this patent is extended or adjusted under 35 U.S.C. 154(b) by 0 days.

(21) Appl. No.: 10/736,092

(22) Filed: Dec. 15, 2003

(65) Prior Publication Data

US 2004/0126588 A1 Jul. 1, 2004

Related U.S. Application Data

(63) Continuation of application No. 10/061,776, filed on Feb. 1, 2002, now Pat. No. 6,680,359, which is a continuation of application No. 09/469,599, filed on Dec. 21, 1999, now abandoned.

(51) Int. Cl.$^7$ .............................................. C08G 64/00
(52) U.S. Cl. ........................ 528/196; 428/412; 446/72; 558/262; 558/266
(58) Field of Search .......................... 428/412; 446/72; 528/196; 558/262, 266

(56) References Cited

U.S. PATENT DOCUMENTS

| | | | |
|---|---|---|---|
| 3,248,415 A | 4/1966 | Stevens et al. | 260/463 |
| 3,301,824 A | 1/1967 | Hostettler | 260/77.5 |
| 3,585,168 A | 6/1971 | Inoue et al. | 260/77.5 D |
| 3,706,713 A | 12/1972 | Hull et al. | 260/77.5 D |
| 3,896,090 A | 7/1975 | Maximovich | 260/77.5 D |
| 4,076,547 A | 2/1978 | Lester et al. | 106/109 |
| 4,145,525 A | 3/1979 | Dixon et al. | 528/404 |
| 4,172,054 A | 10/1979 | Ogawa et al. | 260/8 |
| 4,229,790 A | 10/1980 | Gilliland et al. | 364/200 |
| 4,665,136 A | 5/1987 | Santangelo et al. | 525/523 |
| 4,686,273 A | 8/1987 | Harris | 528/196 |
| 4,686,276 A | 8/1987 | Myers | 528/371 |
| 4,789,727 A | 12/1988 | Sun | 528/504 |
| 4,826,887 A | 5/1989 | Kuyper et al. | 521/189 |
| 4,826,952 A | 5/1989 | Kuyper et al. | 528/405 |
| 4,826,953 A | 5/1989 | Kuyper et al. | 528/405 |
| 4,943,677 A | 7/1990 | Rokicki | 528/405 |
| 4,960,862 A | 10/1990 | Carroll et al. | 528/405 |
| 5,037,950 A | 8/1991 | Bezwada et al. | 528/354 |
| 5,258,068 A | 11/1993 | Shapero et al. | 106/208 |
| 5,310,421 A | 5/1994 | Shapero et al. | 106/208 |
| 5,506,421 A | 4/1996 | Palmour | 106/208 |
| 5,536,806 A | 7/1996 | Sant' Angelo | 528/196 |
| 5,772,684 A | 6/1998 | Shrock | 606/236 |
| 5,916,949 A | 6/1999 | Shapero et al. | 524/487 |
| 5,936,014 A | 8/1999 | Voigt et al. | 524/51 |
| 5,955,125 A | 9/1999 | Hoeting et al. | 426/104 |

FOREIGN PATENT DOCUMENTS

| | | |
|---|---|---|
| DE | 19517682 A | 11/1996 |
| EP | 0741006 A | 11/1996 |
| EP | 741006 | 11/1996 |
| FR | 2178461 | 11/1973 |
| JP | 01282209 A | 11/1989 |
| JP | 02003425 | 1/1990 |

OTHER PUBLICATIONS

"QPAC® Copolymers—Poly(alkylene carbonates)– A New Generation of Thermoplastics Based on $CO_2$ and Expoxides", *PAC Polymers Inc.,* 1995.
XP–002178913, Japan (abstract only).

*Primary Examiner*—Terressa Boykin
(74) *Attorney, Agent, or Firm*—McDermott Will & Emery LLP

(57) ABSTRACT

This invention relates to polymeric thermoplastic moldable compositions comprising poly(alkylene carbonates), which are useful in manufacturing of articles which may be manipulated and shaped by their user, but regain their shape after distortion. These compositions are free from toxic compounds and have a glass transition temperature from about 15° C. to about 132° C. These compositions are useful in manufacturing of articles such as toys, utensils to convey solids or liquids to the mouth, soothing articles (i.e., teething rings and pacifiers) and articles which support food (i.e., candy/confection sticks or holders.) They are most useful in manufacturing of children's toys and products.

6 Claims, No Drawings

MOLDABLE COMPOSITIONS

This application is a Continuation of Ser. No. 10/061,776 filed Feb. 1, 2002 now U.S. Pat. No. 6,680,359 which is a Continuation of Ser. No. 09/469,599 filed Dec. 21, 1999 now abandoned.

This invention relates generally to polymeric thermoplastic moldable compositions comprising poly(alkylene carbonates) which are useful in manufacturing articles including, but not limited to articles which may be manipulated and shaped by their users but regain their shape after distortion.

BACKGROUND OF THE INVENTION

Plastics manufactured today for use in articles such as children's toys and products which are placed in the mouth of the user either by design or action of the user pose certain health risks to the user, i.e., toxicity to the user from the polymers used to manufacture the article or toxicity from the processing aids used in the manufacturing of the polymeric article. In addition to the direct health risks to the user of these articles, there may be environmental hazards as well.

Polyvinyl chloride (PVC) is a commonly used polymeric material for the manufacture of children's toys and products. Polyvinyl chloride is also used in a number of other articles such as toothbrushes, toys, eating utensils, food storage containers, and dinnerware. Since softness which is the ability of a compound to bend, yield or become flexible when gentle pressure is applied, (i.e., having a glass transition temperature from about 15° C. or higher) is not an inherent property of PVC as well as other plastics, and since softness is a desired component for many of the articles made from PVC or other plastics, especially articles intended to be used by children, there is a need to add this property to the PVC. A common way of addressing this need is to add or employ a processing aid in the manufacturing process. Processing aids generally are added in the manufacturing of polymeric materials to increase flexibility, workability and extrudablitiy of the end product. In the case of PVC, processing aids generally referred to as plasticizers and exemplified by a class of compounds known as phthalates are used to add softening and flexibility properties to the end product made from PVC. Phthalates are alkyl esters of isomeric benzenedicarboxylic acids. However, these compounds (phthalates) have been linked to liver and kidney damage. Also, it has been reported in the literature that when used as a processing aid in the preparation of products made of PVC, the phthalates can be leached out of the PVC product. This leaching occurs when the PVC product containing the phthalates comes in contact with human saliva. This situation is of particular concern with products that are intended for use by children, especially children under the age of three.

From an environmental standpoint, the PVCs currently on the market pose health and environmental hazards when the products are eventually destroyed or eliminated through combustion or thermal decomposition. When PVCs are burned, they decompose in to chlorinated chemicals, chlorine and hydrochloric acid, which are toxic. Chlorine and hydrochloric acid are corrosive and the chlorinated compounds are often flammable, as well as corrosive, and destructive to the protective stratosphere which is implicated in global warming and increased cancer hazards due to excessive UV exposure.

Plastics currently on the market, which add potentially toxic plasticizer additives, do not have low glass transition temperatures allowing for more flexibility and softness as desired when a user is handling, i.e., softening them from contact with the body caused by body heat. These plastics also do not offer abrasion resistance, durability, brilliant coloring and weather resistance in one product.

Therefore, there exists a need in the art for a polymeric material, free of toxic plasticizers, having softness, flexibility, abrasion resistance, durability, coloring and weather resistance properties, and useful in the manufacturing of products which may be placed in the mouth either by design or by the action of the user. A need especially exists for a polymeric material having the aforementioned properties for the manufacturing of products used by children, particularly children under three years of age.

PRIOR ART DISCUSSION

Harris, U.S. Pat. No. 4,686,273 discloses a process for modifying and increasing the molecular weight of a poly (alkylene carbonate) polyahl, with at least one modifier having a plurality of moieties that are reactive with the carbonate and/or acting hydrogen moieties of the poly (alkylene carbonate) polyahl at elevated temperatures and at a pressure at which at least one compound other than a monoalkylene glycol which compound is at least as volatile as a tetraethylene glycol is removed in the gaseous state from the poly(alkylene carbonate) polyahl.

Rokicki, U.S. Pat. No. 4,943,677 discloses a process for preparing poly(alkylene carbonates) of controlled molecular weight by copolymerizing carbon dioxide and one or more oxirane compounds using zinc polycarboxylate catalyst in the presence of a sterically hindered organic proton donor.

Carroll, et al., U.S. Pat. No. 4,960,862 discloses a process for regenerating metallo-organic catalyst used in copolymerizing carbon dioxide with epoxides to form poly(alkylene carbonates).

Maximovich, U.S. Pat. No. 3,896,090 discloses a process for preparing polycarbonates from an alkylene carbonate and monomeric polyols.

Myers, U.S. Pat. No. 4,686,276 discloses a process for preparing poly(alkylene carbonate) polymer by the reaction of alkylene oxide with carbon dioxide and/or an alkylene carbonate at an elevated temperature and pressure.

Sun, U.S. Pat. No. 4,789,727 discloses a process for preparing poly(alkylene carbonates) by the reaction of alkylene oxides with carbon dioxide in the presence of a catalyst comprising zinc carboxylate and or diepoxide.

Kuyper, et al., U.S. Pat. No. 4,826,887 discloses a process for preparing polycarbonates by reacting an epoxy compound with carbon dioxide at 40° to 200° C. and 2 to 40 bar in the presence of a catalyst.

Bezwada, et al., U.S. Pat. No. 5,037,950 discloses copolymers comprising p-dioxanone and poly(alkylene carbonates) useful in fabrication of sterile surgical articles and bioabsorbable coatings for sutures.

Stevens, U.S. Pat. No. 3,248,415 discloses a process for preparing high molecular weight polycarbonates from carbon dioxide and 1,2 epoxides.

While the foregoing discloses a number of processes for preparing the poly(alkylene carbonates) as well as a number of different uses for poly(alkylene carbonates), there is no art which addresses the use of this class of polymers for applicant's invention. Therefore, there remains a need in the art for this particular application of poly(alkylene carbonates).

SUMMARY OF THE INVENTION

The present invention offers a polymeric thermoplastic moldable composition comprising polyalkylene carbonates useful in manufacturing of products which may be manipulated and shaped by the user but regain their shape after distortion. Accordingly, it is an object of the present invention to provide a moldable composition which is non-toxic. It is an object of the present invention to provide a moldable composition which has the properties of softness, flexibility, abrasion resistance, durability, coloring and weather resistance, polymeric thermoplasticity, elastomeric with recovery and oil resistance. It is a further object of the present invention to provide products which are made from the polymeric thermoplastic moldable composition of the present invention which are safe when placed in the human mouth and exposed to human saliva. It is a still further object of the present invention to provide a method of manufacturing products which may be manipulated and shaped by the user but will regain their shape after distortion wherein the method is safe and cost-effective. It is a still further object of the present invention to provide a polymeric thermoplastic moldable composition which is useful in the manufacturing of articles intended for use by children especially, but not limited to children under the age of three.

Definition of Terms

The term "manipulated and shaped by the user" is defined as the distortion of the article from its intended, original molded shape by the user of the article. For example, a straw which is molded to be straight can be bent by the user; a teething ring or pacifier can be compressed by the user's teeth or gums; the handle portion of utensils designed to convey food to the mouth can be bent from its original position.

The term "toy" is defined as an article designed to amuse the user; these types of articles are usually intended to be used by children. Toys can be exemplified by, but not limited, to solid or hollow balls, sphericals, footballs, baseballs, puzzles, blocks, saucers and disks intended for throwing, dolls and figurines.

The term "soothing article" is defined as an article intended to ease or mitigate pain to some degree. These articles can be exemplified by teething rings and pacifiers.

The term "utensils for the purposes of conveying solids or liquids to the mouth" is meant to include, but not limited to, spoons, forks, knives, baby bottle nipples, straws, sipping cup lids and cups.

The term "articles which support food" is meant to include, but not be limited to, candy/confection sticks or holders, frozen novelty holders (i.e., ice cream/ice pops).

DESCRIPTION OF THE PREFERRED EMBODIMENTS

The present invention relates to a moldable composition comprising poly(alkylene carbonates) which are useful in manufacturing of articles which may be manipulated and shaped by their users, but regain their shape after distortion. The articles which are made from the poly(alkylene carbonate) compositions may be molded into any desired shape and form. The compositions may also be molded into a solid, walled article in which a liquid (i.e., water) may be contained. The poly(alkylene carbonates) of the present invention have a glass transition temperature ranging from about 15° C. to about 132° C.

Articles which are suitable for the practice of this invention are toys which are created for the amusement of the user especially children; i.e., solid or hollow balls, sphericals, footballs, baseballs, puzzles, blocks, saucers and disks intended for throwing, dolls and figurines, utensils for the purpose of conveying food or liquids to the mouth (i.e., straws, spoons); articles which may be placed in the mouth for soothing purposes (i.e., teething rings and pacifiers) and articles which support food (i.e., candy/confection sticks or holders).

The properties of poly(alkylene carbonates) allow for safe, durable and creative usage. Because of the low glass transition temperature (preferably from about 15° C. to about 40° C.) of certain poly(alkylene carbonates), products held in a hand or used in the mouth become more soft and flexible. In products including, but not limited to, feeding utensils, toothbrushes, straws and sticks or holders for candy/confections, there would be less potential for injury to the child if they should fall with the product. The flexibility of the plastic would allow for compression when pressure is applied to products including, but not limited to, teething rings and pacifiers. When pressure is removed, the object will recover to its original shape. In items including, but not limited to, teething rings, pacifiers, toothbrushes, sipping cup lids, feeding utensils and bottle nipples, the abrasion resistant property would minimize teethmark wear and the potential for the user to extract plastic particles from the product. Additionally, poly(alkylene carbonates) are weather resistant and would retain color and durability when used for, but not limited to, furniture and toys that are intended for outdoor use. Finally, the clear property of poly(alkylene carbonates) gives products the ability to color more brilliantly, or to remain clear.

Poly(alkylene carbonates), also known as $CO_2$ copolymers are straight, chains of repeating units of molecules resulting from the reaction of olefinically saturated aliphatic 1,2 epoxides with carbon dioxide.

Olefinically saturated aliphatic compounds which are suitable for use in the syntheses of poly(alkylene carbonates) are exemplified by ethylene, propylene, butylene and pentene. A complete discussion on the synthesis for poly (alkylene carbonates) can be found in U.S. Pat. No. 4,943,677 which is hereby incorporated by reference.

Poly(alkylene carbonates) have many unique characteristics including some of which are, but not limited to, lubricity, low glass transition temperature, clean products from combustion (primarily carbon dioxide and water), abrasion resistance, weather resistance, clear coloration, and oil resistance. The elastomeric polymers of this class of polymers, poly(ethylene carbonates) and poly(butene carbonate), which can be stretched, are polymeric thermoplastic, oil resistant, have a high degree of recovery, and a low glass transition temperature, are particularly useful in the practice of this invention.

Depending on the specific properties desired for the molded article the composition may contain a single poly (ethylene carbonate) or a blend of two or more poly(alkylene carbonates).

The use of poly(ethylene carbonates) or poly(butene carbonates), for instance, used singly in a composition would produce a molded article having softness and flexibility at relatively low temperatures from body heat. The use of poly(cyclohexene carbonate) having a glass transition temperature of 132° C. would produce a molded article having more rigidity. It will be apparent to those skilled in the art, however, that additional material other than the poly(alkylene carbonates), may be added to the composition to aid in manufacturing or add additional properties to the composition.

There are many different molding/forming processes for molding articles of the present invention. These processes can be exemplified by coating, swaging, shaping, die-pressing, laminating, extruding and molding, including injection molding.

Poly(alkylene carbonates) are normally polymeric thermoplastic polymers. Polymeric thermoplastic polymers soften on heating and harden when cooled and can be re-softened by reheating. Poly(alkylene carbonates) can be made thermosetting by appropriate cross-linking. Thermosetting polymers soften on heating but harden by continuous exposure to heat and subsequently cannot be softened thereafter by heating again.

Poly(alkylene carbonates) can be made with a wide range of properties. These properties can range from soft elastomeric polymers to hard engineering, rigid type polymers, based on the epoxide used to react with carbon dioxide, e.g., they can have glass transition temperatures, i.e., softening points that range from about 15° C. to about 132° C. Poly(alkylene carbonates) can also have the following properties depending on the particular epoxide used in the process:

Biodegradable (i.e., poly(ethylene carbonates))

Enzyme degradable (i.e., poly(ethylene carbonates))

Elastomeric with high recovery from deformation (i.e., (poly(ethylene carbonates), poly(butene carbonates))

Clear and amorphous

Durable and printable

Abrasion resistant (i.e., (polyethylene carbonates))

Low glass transition temperatures (i.e., poly(ethylene carbonates)) about 25° C.; poly(propylene carbonates) about 40° C.; poly(butene carbonates) about 15° C.)

Processed easily with conventional equipment, e.g., molding, extrusion, etc.

Coloring brilliance

Excellent adhesion to paper

Recyclable

Oil barrier (i.e., poly(ethylene carbonates), poly(butene carbonates))

Oxygen barrier

Example for Molding an Article of the Present Invention

Injection molding using poly(ethylene carbonate) and poly(propylene carbonate) to form a molded article according to the invention is as follows:

Machine:

1. Injection molding machine with three-zone heating in the barrel
2. One inch diameter screw
3. Length to diameter ratio of 20 to 1
4. Pellet, granular or powder, feed

| Conditions | Temperature ° C. | Preferred ° C. |
|---|---|---|
| Nozzle | 130–190 | 160–185 |
| Front zone | 130–190 | 160–185 |
| Middle zone | 150–180 | 160–175 |
| Rear zone | 110–150 | 130–145 |

| Cycle Times | |
|---|---|
| Overall cycle time | 50–70 seconds |
| Overall injection time | 12–18 seconds |
| Initial injection time | 6–12 seconds |
| Initial injection pressure | 500–700 pounds per square foot |
| Secondary injection pressure | 200–400 pounds per square foot |
| Screw speed | 20–30 rpm |

Throat must be cold.

Mold must be chilled (dry ice)

Process conditions will be affected by the polymer molecular weight distribution.

Blends of poly(ethylene carbonate) and poly(propylene carbonate) can be made to obtain properties in between those of the two polymers, if this is desirable, e.g., a blend of elastomeric poly(ethylene carbonate) and more rigid, non-elastomeric poly(propylene carbonate) would give properties between the two on rigidity/elasticity.

Poly(ethylene carbonates) having a glass transition temperature between about 20° C. to about 25° C. and having the properties of softening, flexibility, polymeric thermoplasticity, elastomeric, oil and oxygen barrier are useful in the compositions of the present invention.

What is claimed:

1. A molded article for use by a child capable of being manipulated and distorted from its original shape when placed in the mouth of a child and exposed to the child's saliva but capable of regaining its original shape after distortion wherein said molded article comprises a poly (alkylene carbonate) having a glass transition temperature from about 15° C. to about 40° C. wherein said poly (alkylene carbonate) comprises a blend of two or more poly(alkylene carbonates) wherein the poly(alkylene carbonates) are selected from the group consisting of poly (ethylene carbonates), poly(butene carbonate) and poly (propylene carbonates), and wherein said molded article is free from toxic plasticizers or softening aids.

2. The molded article according to claim 1 wherein said molded article is selected from the group consisting of children's toys, soothing articles, feeding implements and articles which support food.

3. The molded article according to claim 2 wherein the toys are selected from the group consisting of solid or hollow balls, sphericals, footballs, baseballs, puzzles, blocks, saucers and disks intended for throwing, dolls and figurines.

4. The molded article according to claim 2 wherein the soothing articles are selected from teething rings and pacifiers.

5. The molded article according to claim 2 wherein the feeding implements are selected from the group consisting of children's spoons, forks, knives, bottle nipples, straws, sipping cup lids and cups.

6. The molded article according to claim 2 wherein the articles which support food are selected from candy and confection sticks and frozen novelty holders.

* * * * *